United States Patent
Sommer et al.

(10) Patent No.: US 10,040,229 B2
(45) Date of Patent: Aug. 7, 2018

(54) METHOD FOR PRODUCING A PISTON

(71) Applicant: WABCO GmbH, Hannover (DE)

(72) Inventors: Lars Sommer, Springe (DE); Uwe Stabenow, Laatzen (DE)

(73) Assignee: WABCO GmbH, Hannover (DE)

(*) Notice: Subject to any disclaimer, the term of this patent is extended or adjusted under 35 U.S.C. 154(b) by 395 days.

(21) Appl. No.: 14/414,508

(22) PCT Filed: Sep. 11, 2013

(86) PCT No.: PCT/EP2013/002724
§ 371 (c)(1),
(2) Date: Jan. 13, 2015

(87) PCT Pub. No.: WO2014/053211
PCT Pub. Date: Apr. 10, 2014

(65) Prior Publication Data
US 2015/0209986 A1    Jul. 30, 2015

(30) Foreign Application Priority Data
Oct. 6, 2012   (DE) .................... 10 2012 019 618

(51) Int. Cl.
*B29C 45/14*    (2006.01)
*F04B 1/04*    (2006.01)
(Continued)

(52) U.S. Cl.
CPC ...... *B29C 45/14336* (2013.01); *F04B 1/0408* (2013.01); *F04B 39/042* (2013.01);
(Continued)

(58) Field of Classification Search
None
See application file for complete search history.

(56) References Cited

U.S. PATENT DOCUMENTS

| 4,848,213 A | 7/1989 | Wood et al. |
| 5,022,312 A * | 6/1991 | Rozek ..................... F04B 53/14 156/73.1 |

(Continued)

FOREIGN PATENT DOCUMENTS

| DE | 3233854 A1 | 3/1984 |
| DE | 3824780 A1 | 1/1990 |

(Continued)

*Primary Examiner* — Edmund Lee
(74) *Attorney, Agent, or Firm* — Brinks Gilson & Lione (57) ABSTRACT

A method is disclosed for producing a piston (8) having a circumferential seal in the form of a circular cup seal (16). In a functional, installed state, the cup seal (16) has a profile consisting of a leg held in the piston (8) and aligned radially with respect to the piston longitudinal axis (19) in a radial region (17) and of a leg which is bent by approximately 90° into an axial region (18) and is aligned approximately parallel to the piston longitudinal axis (19). The cup seal (16) is mounted in a mold as a flat or arched preform (21, 21a) with a radial region (17a, 17b) which forms the approximately radial leg, aligned with the piston longitudinal axis (19). A circumferential region (18a, 18b) projecting radially beyond the mold cavity is shaped into the axial region (18) after removing the piston from the mold to obtain the functional contour of the installed state of the cup seal (16).

16 Claims, 7 Drawing Sheets

(51) Int. Cl.
    *F04B 39/04*     (2006.01)
    *F04B 53/14*     (2006.01)
    *B29K 77/00*     (2006.01)
    *B29K 627/18*     (2006.01)
    *B29L 31/00*     (2006.01)

(52) U.S. Cl.
    CPC .. *F04B 53/143* (2013.01); *B29C 2045/14459* (2013.01); *B29K 2077/00* (2013.01); *B29K 2627/18* (2013.01); *B29L 2031/7494* (2013.01)

(56) References Cited

U.S. PATENT DOCUMENTS

| | | |
|---|---|---|
| 5,064,359 A | 11/1991 | Plummer |
| 5,937,736 A | 8/1999 | Charpie |
| 7,290,481 B2 | 11/2007 | Suzuki et al. |

FOREIGN PATENT DOCUMENTS

| | | |
|---|---|---|
| DE | 19727186 A1 | 1/1998 |
| EP | 0353462 A1 | 2/1990 |
| EP | 1801416 A1 | 6/2007 |
| JP | S6125730 A | 2/1986 |
| JP | S6432477 U | 3/1989 |
| JP | H10156814 A | 6/1998 |
| JP | 2006266256 A | 10/2006 |
| JP | 2008248813 A | 10/2008 |

\* cited by examiner

METHOD FOR PRODUCING A PISTON

TECHNICAL FIELD

The invention relates to a method for producing a piston having a central piston longitudinal axis and a piston circumference and having a circumferential seal in the form of a circular cup seal, wherein, in its shape having the functional contour of the installed state, the cup seal consists of a leg held in the piston and aligned radially with respect to the piston longitudinal axis in a radial region and of a leg which is bent by approximately 90° into an axial region and is aligned approximately parallel to the piston longitudinal axis, for arrangement in a cylinder of a reciprocating piston machine, e.g. a piston compressor.

BACKGROUND

DE 197 27 186 B4 discloses a pendulum-piston and cylinder arrangement. The pendulum piston is produced integrally together with a connecting rod. A cup seal composed of polytetrafluoroethylene (PTFE) is clamped by means of its leg oriented radially with respect to the piston longitudinal axis between a piston rim and a pressure plate secured on the piston by means of a central screw, while an approximately circular leg bent by approximately 90° and aligned approximately parallel to the piston longitudinal axis provides sealing with respect to a cylinder in which the piston moves backward and forward. The cup seal is supplied for assembly in the shape described having the functional contour of the installed state and is secured in this form on the piston by means of the pressure plate, allowing the piston to be installed in the cylinder with the cup seal. However, resizing of the cup seal before installation in the cylinder is generally required for this purpose. This sizing step leads to increased manufacturing costs.

EP 1 801 416 B1 discloses a reciprocating piston machine, in particular a piston compressor, having a cylinder, a piston running in the cylinder while being sealed off by means of a sealing collar, having a drive motor acting on a crankshaft, the drive shaft of which motor is received by a bore in the crankshaft, and having a connecting rod having a connecting rod shank, at one end of which a connecting rod eye for receiving a crankpin of the crankshaft is formed and on the other end of which the piston formed integrally with the connecting rod is formed. The seal, which is designed as a cup seal, is fixed by means of its leg extending radially in the direction of the piston longitudinal axis, on an encircling shoulder of the piston by means of a press-on ring. The outer contours of the press-on ring and of the piston are of spherical design, in particular being designed as spherical segments.

The press-on ring is required in order firstly to be able to push the relatively stiff sealing collar, which is designed like a closed ring, in an axial direction onto the piston as far as the piston shoulder and then to fix the radially oriented flange on the piston. The press-on ring can be fixed solely by means of a pressing action between the piston and the press-on ring. However, it is also possible, additionally or exclusively, to adhesively bond the press-on ring to the piston or to weld it to the piston, in particular by ultrasonic welding, if the press-on ring and the piston are composed of plastic. Particularly in the case of a piston made of plastic, problems often occur in practice with the pressure between the piston and the press-on ring, which are made from different materials for example, e.g. a metal press-on ring and a piston made of plastic, or in the case of a press-on ring and a piston made of plastic owing to the inadequate pressing action due to the flowing effect of the plastic. An adhesive bond between the press-on ring and the piston poses demanding requirements on the cleanliness of the production process, does not have a very high process reliability and gives rise to increased costs. This also applies to welding the press-on ring to the piston.

SUMMARY OF THE INVENTION

Given this background, it is the underlying object of the invention to propose a method for producing a piston having a circumferential seal in the form of a cup seal, a piston produced by this method and a piston machine having at least one piston produced by this method, for which fewer working steps are required than in the case of the prior art mentioned in order to bring about the functional contour of the installed state and which ensure reliable and low-cost attachment of the cup seal to the piston.

This object is achieved in the case of a method for producing a piston having a central piston longitudinal axis and a piston circumference and having a circumferential seal in the form of a circular cup seal, wherein, in its shape having the functional contour of the installed state, the functional contour consists of a leg held in the piston and aligned radially with respect to the piston longitudinal axis in a radial region and of a leg which is bent by approximately 90° into an axial region and is aligned approximately parallel to the piston longitudinal axis, by virtue of the fact that the cup seal is placed into a mold having a mold cavity for molding the piston in a first step in such a way that the radial region projects into the mold cavity and is radially centered in the mold cavity and that the axial region is held by the mold in a shape of a circumferential region that differs from the shape of the axial region of the functional contour, only the radial region projecting into the mold cavity is overmolded in a second step by filling the mold cavity with piston material, the piston is removed from the mold, and the shape of the circumferential region is changed into the shape of the axial region of the functional contour.

A flat or arched preform for the production of the cup seal can be produced at lower cost by the manufacturer of the seal than a cup seal which has the functional contour of the installed state and that the shaping of the cup seal into the axial region bent by approximately 90° to obtain the functional contour of the installed state in the cylinder can be performed directly on the piston, this shaping operation simultaneously bringing about the sizing of the axial region, bent by approximately 90°, of the cup seal, with no additional operation being required for this purpose.

The term "functional contour of the installed state in the cylinder" should be taken to mean the contour of the cup seal which the cup seal has when the axial region, bent by approximately 90°, of the cup seal has a slightly larger diameter than the inside diameter of the cylinder into which the piston with the cup seal is fitted, namely is larger by an oversize such that the required sealing effect is achieved through the pressure of the cup seal in the cylinder while at the same time maintaining mobility of the piston with as little friction as possible.

The encircling radial region, aligned radially with respect to the piston longitudinal axis, of the flat or slightly arched preform can be permanently clamped on the piston by means of a press-on ring in a first step, after which a circumferential region of the preform projecting radially beyond the circumference of the piston is permanently shaped to the functional contour of the installed state in a second step in order to form the encircling axial region of the cup seal bent by approximately 90° and aligned approximately parallel to the piston longitudinal axis.

The method can preferably be carried out in such a way that the shaping of the circumferential region of the preform which projects radially beyond the circumference of the piston into the functional contour of the installed state of the cup seal takes place as cold or hot forming by means of a sizing tool surrounding the circumferential region of the preform, which sizing tool is preferably of annular design, has an inside diameter corresponding approximately to the outside diameter of the axial region of the cup seal, said axial region having the functional contour of the installed state of the cup seal and being bent by approximately 90°, and, to shape the radially projecting circumferential region of the preform into the axial region, bent by approximately 90°, of the cup seal, is moved in the axial direction relative to the piston, over the radially projecting circumferential region of the preform, while surrounding the piston circumference.

Instead of a separate sizing tool, the cylinder of the reciprocating piston machine can also be designed as a sizing tool, with the result that the shaping of the radially projecting circumferential region of the preform into the functional contour of the installed state of the cup seal is brought about by pushing the piston with the preform mounted thereon into the cylinder.

The use of a separate annular sizing tool has the advantage that the sizing tool can be heated in a simple manner if the shaping of the circumferential region of the preform into the functional contour of the installed state is carried out as a hot forming operation at a predetermined temperature, e.g. 200° C. Although it is also possible to heat a cylinder of the reciprocating piston machine, it is more difficult to achieve since the reciprocating piston machine has intake and exhaust elements in the region of the cylinder which impede the arrangement of a heating device on the cylinder. Moreover, in this case a removable cylinder head having the inlet and exhaust elements is required since the piston having the cup seal having the functional contour of the installed state must be introduced into the cylinder from the cylinder head side in order to be able to carry out the shaping of the circumferential region of the preform projecting radially beyond the circumference of the piston into the functional contour of the installed state of the cup seal. It is advantageous in this case if no separate sizing tool is required and shaping into the functional contour of the installed state takes place during the assembly of the reciprocating piston machine.

According to another aspect of the invention, a cup seal having the functional contour of the installed state is placed in a mold having a mold cavity for molding the piston in a first step in such a way that its axial region, which is bent by approximately 90°, is elastically deformed into a shape that differs from the functional contour of the installed state of the cup seal and only the encircling radial region of the cup seal, which is aligned radially with respect to the piston longitudinal axis, projects into the mold cavity, this radial region of the cup seal projecting into the mold cavity is overmolded in a second step by filling the mold cavity with piston material, and the piston is removed from the mold in a third step, with the result that the circumferential region of the cup seal, which was deformed elastically in the mold and is bent by approximately 90°, is released and returns elastically to the functional contour of the cup seal corresponding to the installed state.

In this method, no preform is introduced into a mold; instead the ready-to-install cup seal, the encircling radial region of which, which is aligned radially with respect to the piston longitudinal axis, is overmolded with piston material. The essential feature with this method is that the axial region, bent by approximately 90°, of the cup seal is elastically deformed as it is placed in the mold and springs back into its original position after the production of the piston and removal from the mold.

According to one embodiment of this method, the axial region, bent by approximately 90°, of the cup seal can be bent open elastically by up to approximately 90° in an approximately radial direction and substantially in alignment with the radial region, oriented radially with respect to the piston longitudinal axis, of the cup seal as it is introduced into the mold and can be surrounded by the mold, with the result that this circumferential region, bent open by approximately 90°, of the cup seal is released when the piston is removed from the mold, and the axial region, bent open by approximately 90°, of the cup seal springs back elastically into the position bent by 90°, which has the functional contour of the installed state.

In order to be able to carry out this bending open by approximately 90° particularly easily, the axial region, bent by approximately 90°, of the cup seal can have predetermined breaking points distributed over the circumference, these tearing open during the bending open process and closing again upon removal from the mold during the process of springing back into the position bent by approximately 90°.

If predetermined breaking points of this kind are to be avoided, it is also possible to overbend the axial region, bent by approximately 90°, of the cup seal radially in the direction of the piston longitudinal axis as it is being introduced into the mold and for it to be surrounded by the mold, with the result that this axial region, which is bent by approximately 90° and is overbent in the mold, is released when the piston is removed from the mold and returns elastically to the position bent by approximately 90°, which has the functional contour of the installed state and forms a conical gap toward the piston circumference.

The essential point with these variants of the method is that the radial region of the cup seal, which is aligned radially with respect to the piston longitudinal axis, is overmolded by the piston material and, in the process, the piston is molded integrally with and from the same material as the connecting rod shank.

The object mentioned at the outset is furthermore achieved by a piston having a circumferential seal in the form of a cup seal produced by one of the methods defined above.

A preferred embodiment of the piston consists in that the piston is manufactured as a pendulum piston integrally with a connecting rod comprising a connecting rod shank and a connecting rod eye having a bearing bore at the opposite end of the connecting rod shank from the piston. A pendulum piston of this kind with an integrally formed connecting rod can be produced as a light alloy casting or as a plastic injection molded part. Particularly if the piston is produced as a light alloy casting, it is possible to secure a preform on the piston by means of a press-on ring in order then to form the functional contour of the installed state of the cup seal by means of a sizing tool.

If the piston is produced with the connecting rod from the same material by injection molding plastic in a mold, the radial region, aligned radially with respect to the piston longitudinal axis, both of a preform and of a cup seal having the functional contour of the installed state can be overmolded and enclosed with piston material in a diecasting mold, with the result that it is then possible, when using a preform, to carry out the shaping and sizing into the axial region bent by approximately 90° producing a leg aligned approximately parallel to the piston longitudinal axis and encircling the piston circumference, or with the result that the axial region, bent by approximately 90°, of the cup seal, which extends approximately parallel to the piston longitudinal axis, springs back after removal from the mold into the functional contour of the installed state.

To produce the piston as a plastic injection molded part, it is possible to use a three-part mold, of which two mold halves are divided in a transverse plane extending centrally through the piston and the connecting rod shank and connecting rod eye, and a third mold part adjoins the mold halves in a parting plane extending perpendicularly to the piston longitudinal axis, wherein the parting plane for the third mold part is arranged in the region of the radially extending or radially deformed circumferential regions of the cup seal or of the preform, the closing and opening movements of the two mold halves take place perpendicularly to the piston longitudinal axis and those of the third mold part take place in the direction of the piston longitudinal axis, and the radially extending circumferential regions of the cup seal or the radially deformed circumferential regions of the preform are accommodated in recesses in the two mold halves and/or in the third mold part when the mold is closed. Since the two mold halves only move transversely to the piston longitudinal axis and the third mold part only moves in the direction of the piston longitudinal axis, and thus no oblique movements are required, the mold can be produced at low cost and does not require any long cycle times for moving the mold parts together and apart.

The piston can also be produced with a two-part mold if the two mold halves are divided in a transverse plane extending centrally through the piston and the connecting rod shank, and wherein the axial region, bent by approximately 90°, of the cup seal is accommodated in recesses in the two mold halves when the mold is closed, said recesses being dimensioned in such a way that they overbend the axial region, bent by approximately 90°, of the cup seal in the direction of the piston longitudinal axis, and wherein the opening movement of the two mold halves takes place perpendicularly to the piston longitudinal axis and, during this process, the axial region, bent by approximately 90°, of the cup seal springs back in the direction of the functional contour of the installed state thereof.

For location in the piston, the radial region of the preform and/or the radial region, aligned with respect to the piston longitudinal axis, of the cup seal can have apertures and/or dovetail cutouts, said apertures and/or cutouts being filled by the piston material during the production of the piston.

To seal off the cup seal with respect to the piston, the radial region of the preform and/or the radial region, aligned with respect to the piston longitudinal axis, of the cup seal can be provided with one or more encircling grooves and/or projections, these being compressed during the mounting of the press-on ring or penetrating into the piston material or being filled by the piston material during overmolding with piston material.

A piston machine, e.g. a compressor, can be produced at low cost if at least one piston produced in accordance with one of the features defined above is arranged therein.

The invention is further explained below by means of a number of illustrative embodiments illustrated in the attached drawings.

DETAILED DESCRIPTION OF THE DRAWINGS

Figure 1:
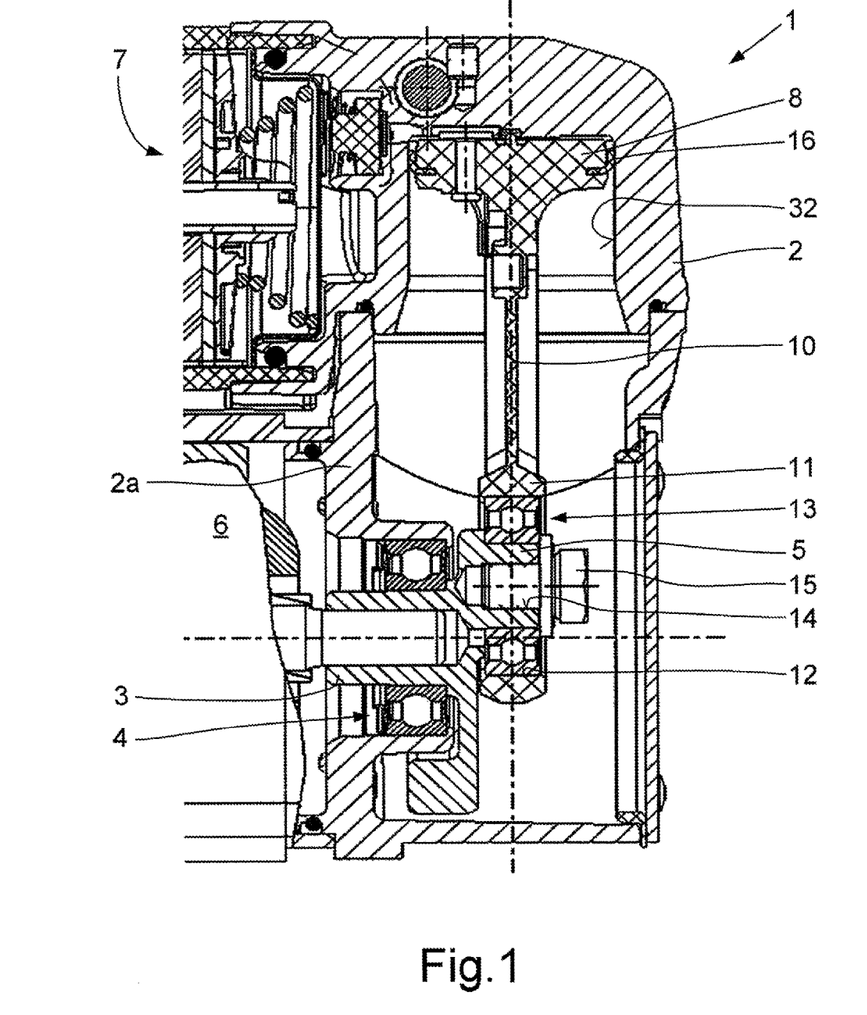
FIG. 1 shows a partial section through a piston machine with an electric drive.

A reciprocating piston machine 1 has at least one cylinder 2, which is produced integrally with a cylinder head, in which only a pressure side 7 of the compressor is shown in part. A suction side is not shown. The pressure side 7 and the suction side (not shown) are conventional, well-known components of a compressor and, since they are not part of the invention, they are not described in detail.

The cylinder 2 is connected to a crankcase 2a, in which a crankshaft 3 is supported by means of a crankshaft bearing 4. The crankshaft 3 is provided with a crankpin 5 and is coupled to an electric drive motor 6. A piston 8 designed as a pendulum piston is guided in the cylinder 2, in a cylinder bore 32, while being sealed off by means of a circumferential seal in the form of a cup seal 16. The piston 8 is produced integrally with a connecting rod by injection molding plastic, said connecting rod consisting of a connecting rod shank 10 and of a connecting rod eye 11. The connecting rod eye 11 has a bearing bore 12 for accommodating a connecting rod bearing in the form of a rolling bearing 13. The rolling bearing 13 is fixed on the crankpin 5 with a bore 14 at its inner race by means of a screw 15.

Since the piston 8 is produced integrally with the connecting rod shank 10, it performs a pendulum movement during its upward and downward movement in the cylinder 2 brought about by the crankpin 5 as the crankshaft 3 rotates and, for this reason, has a piston circumference 9 in the form of a spherical segment. Pendulum pistons 8 of this kind produced integrally with the connecting rod shank 10 are prior art and are described in DE 197 27 186 B4 and EP 1 801 416 B1, for example.

Figure 2:
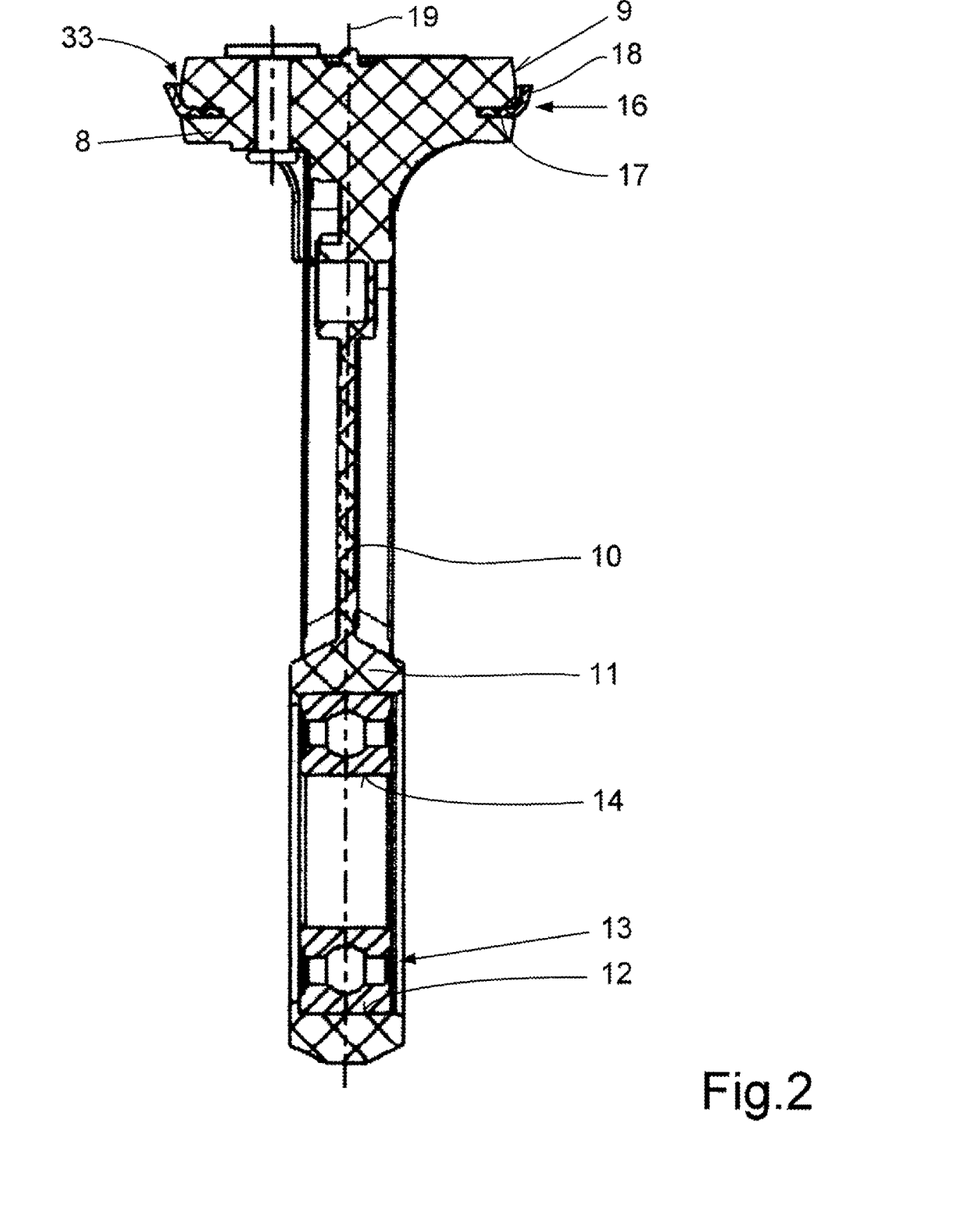
FIG. 2 shows a piston-connecting rod unit produced from injection molded plastic before installation in the reciprocating piston machine according to FIG. 1.

The illustrative embodiment illustrated in FIG. 2 shows a piston 8 produced integrally with a connecting rod shank 10 and a connecting rod eye 11, which are produced as a plastic injection molding with a cup seal 16 molded into the piston 8. Like the cup seal 16, the outer race of the connecting rod bearing 13 can be overmolded by the plastic.

The cup seal 16 has a radial region 17, which is aligned radially in the direction of a piston longitudinal axis 19 and is molded into the piston 8, and an axial region 18, which projects outside the piston circumference 9, is bent by approximately 90° and effects the sealing of the piston 8 in the cylinder 2 in the cylinder bore 32 of the cylinder 2, as illustrated in FIG. 1. One way of producing the piston 8 with the connecting rod shank 10 and the connecting rod eye 11 in a mold 25 is illustrated in FIG. 3.

Figure 3:
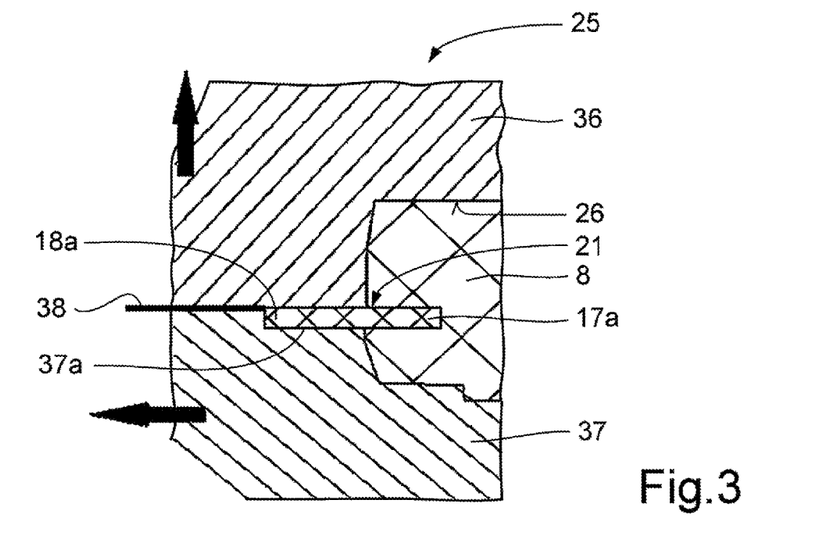
FIG. 3 shows a detail section through a mold for injection molding a piston-connecting rod unit with a molded-in preform.

A mold 25, only part of which is shown in FIG. 3, consists of two mold halves 37, the parting plane (not shown) of which passes through the piston longitudinal axis 19. Only one mold half 37 of the two mold halves is illustrated; a second mold half, which is not illustrated, is arranged symmetrically with respect thereto. To open and close the mold 25, these two mold halves 37 are moved toward one another and away from one another perpendicularly to the piston longitudinal axis 19. A third mold part 36 is arranged in such a way relative to the mold halves 37 that it can be moved toward the mold halves 37 and away from them in the direction of the piston longitudinal axis 19. Accordingly, there is a parting plane 38 which extends perpendicularly to the piston longitudinal axis 19. In the closed position illustrated, the two mold halves 37 and the third mold part 36 form a mold cavity 26, into which a plastic for molding the piston 8, the connecting rod shank 10 and the connecting rod eye 11 is injected.

According to FIG. 3, the mold halves 37 have a recess 37a, which is intended to accommodate a flat or planar circumferential region 18a of a preform 21. This recess 37a can also be arranged in the third mold part 36, or it can extend both into the mold halves 37 and into the third mold part 36. A radial region 17, 17a of the preform 21 which projects radially into the mold cavity 26 in the direction of the piston longitudinal axis 19 is enclosed by piston material as the mold 25 is filled with said piston material and, in this way, is connected positively to the piston 8.

Figure 4:
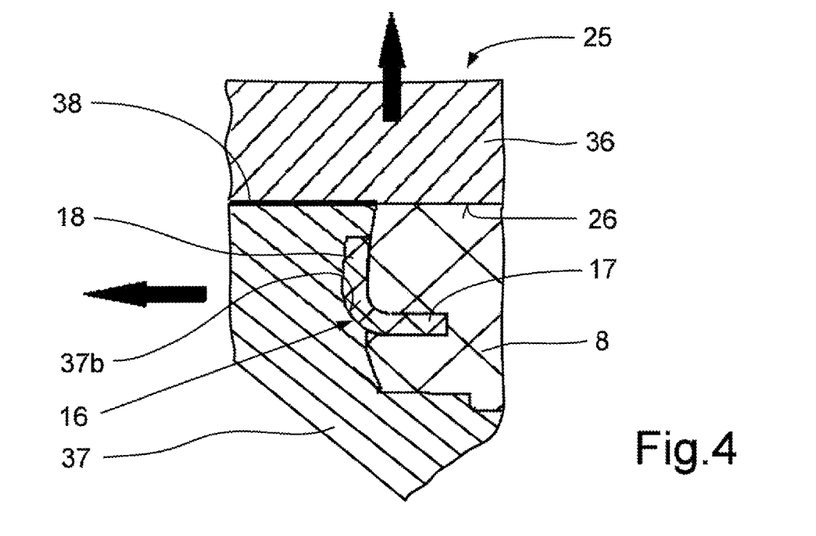
FIG. 4 shows a detail section through a mold for injection molding a piston-connecting rod unit from plastic with a molded-in cup seal.

FIG. 4 shows an embodiment in which the mold 25 likewise consists of two mold halves 37, the parting plane between which extends through the piston longitudinal axis 19, and of a third mold part 36, the parting plane 38 of which relative to the mold halves 37 extends perpendicularly to the piston longitudinal axis 19. In this embodiment, a cup seal 16 having the functional contour of the installed state is placed by its axial region 18 bent by approximately 90° in a recess 37b in the mold halves 37, wherein the recess 37b is shaped and dimensioned in such a way that the axial region 18, bent by approximately 90°, of the cup seal 16 is radially overbent in a direction toward the piston longitudinal axis 19 and is surrounded by the mold halves 37 as the latter are closed. The radial region 17 of the cup seal 16 which projects into the mold cavity 26 is overmolded by the plastics material injected into the mold cavity 26 and held positively thereby. As the mold halves 37 are opened, the axial region 18 bent by 90° and overbent in the mold 25 is released and returns elastically to the position illustrated in FIG. 2, with the result that a conical gap 33 is formed between the piston circumference 9 and the inside of the axial region 18, bent by approximately 90°, of the cup seal 16, this gap being required to guide the piston 8 in a manner sealed with respect to the cylinder bore 32 of the cylinder 2 in all stroke positions.

Figure 5:
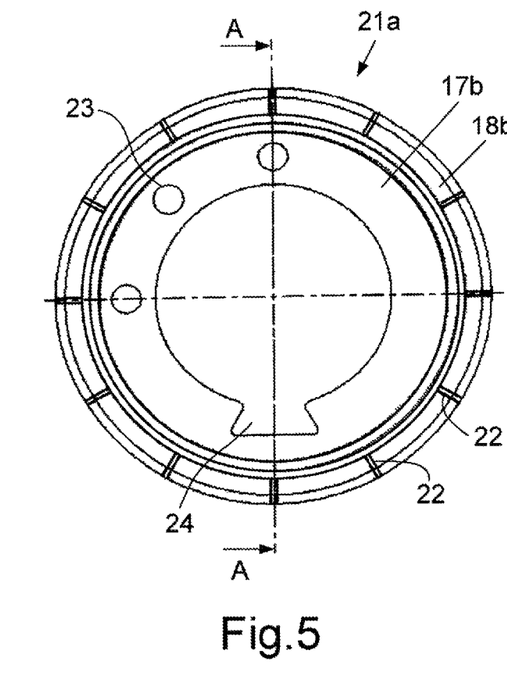
FIG. 5 shows a plan view of a preform.
Figure 6:
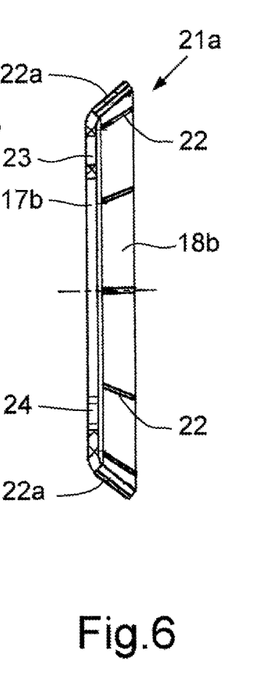
FIG. 6 shows a section of the preform along the line A-A in FIG. 5.

Whereas a flat preform 21 is illustrated in FIG. 3, it may also be necessary to use a preform 21a illustrated in FIGS. 5 and 6, which is pressed flat in the mold 25 in the manner illustrated in FIG. 3 as the two mold halves 37 and the third mold part 36 are closed. For this purpose, the preform 21a can have predetermined breaking points in the form of grooves 22 starting from the inside thereof, which are distributed uniformly over the circumference, these being connected only by thin material regions 22a in the state illustrated in FIGS. 5 and 6. During the process of being pressed flat in the mold 25, these material regions 22a tear.

To locate the cup seal 16 in the piston 8, it is possible, as illustrated in FIGS. 5 and 6, for the preform 21 or the cup seal 16 to have apertures 23 and/or dovetail cutouts 24 in the radial region 17 thereof, these cutouts being filled with the piston material as the mold 25 is filled.

After the piston 8 has been removed from the mold with the connecting rod shank 10 and connecting rod eye 11 molded on and the preform 21 molded in, it is necessary to shape the radially outward-projecting circumferential region 18a of the preform 21 into the shape of the axial region 18 of the cup seal 16, in which it is bent by approximately 90° and has the functional shape of the installed state. According to FIGS. 7 and 8, this can be accomplished by means of a sizing tool 27 that can be heated by a heat source 30. This sizing tool 27 has a conical run-in bevel 28 and a cylindrical inner surface 29, the diameter of which corresponds substantially to the diameter of the axial region 18, bent by 90°, of the cup seal 16. If the piston 8 is moved with its radially projecting circumferential region 18a over the run-in bevel 28 into the position in the sizing tool 27 which is illustrated in FIG. 8, the radially projecting circumferential region 18a of the preform 21 is folded over into the axial region 18, bent by approximately 90°, of the cup seal 16 and is permanently deformed in this position by the action of heat from the heat source 30 on the sizing tool 27, and is therefore ready for installation for the reciprocating piston machine 1 illustrated in FIG. 1.

Figure 7:
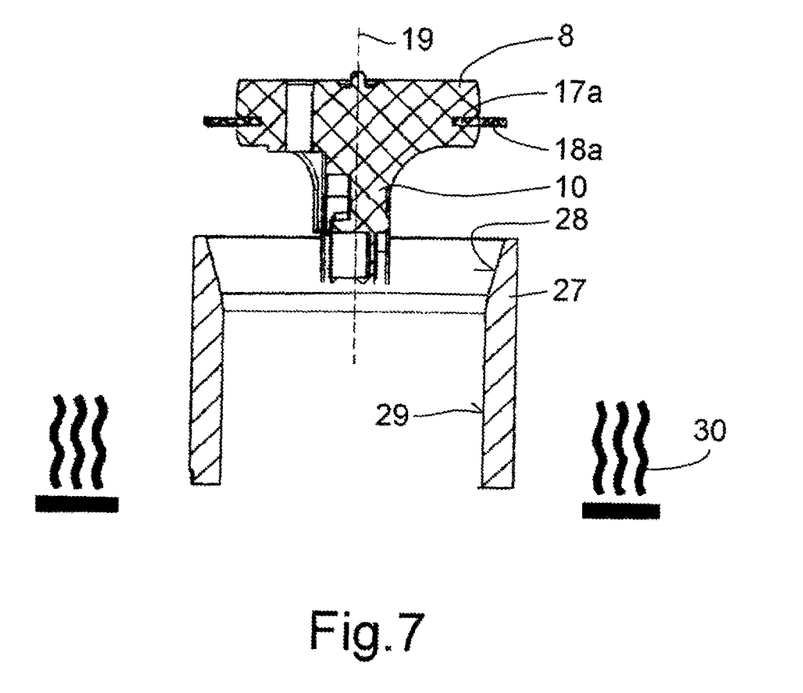
FIG. 7 shows a partial section through the piston-connecting rod unit with a molded-in preform before introduction into a heated sizing tool.
Figure 8:
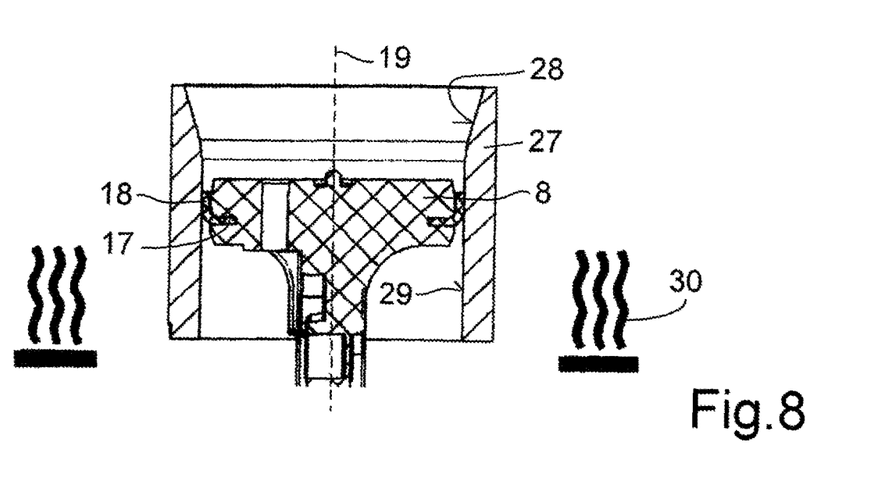
FIG. 8 shows a partial section through a piston-connecting rod unit according to FIG. 7 after introduction into the sizing tool and the shaping of the preform.

If the reciprocating piston machine 1 does not have a cylinder 2 with a cylinder head formed integrally thereon, as illustrated in FIG. 1, but can be provided with a cylinder head that can be fitted separately from the cylinder 2 in a manner not illustrated, a cylinder 31 with a run-in bevel 28 corresponding to the sizing tool 27 can be used as a sizing tool, with a prefabricated unit consisting of the piston 8 with the integrally produced connecting rod shank 10 and the connecting rod eye 11 as well as the molded-in preform 21 being introduced (FIG. 9) into the cylinder bore 32 of the cylinder 31 in the manner described in relation to FIGS. 7 and 8.

Figure 9:
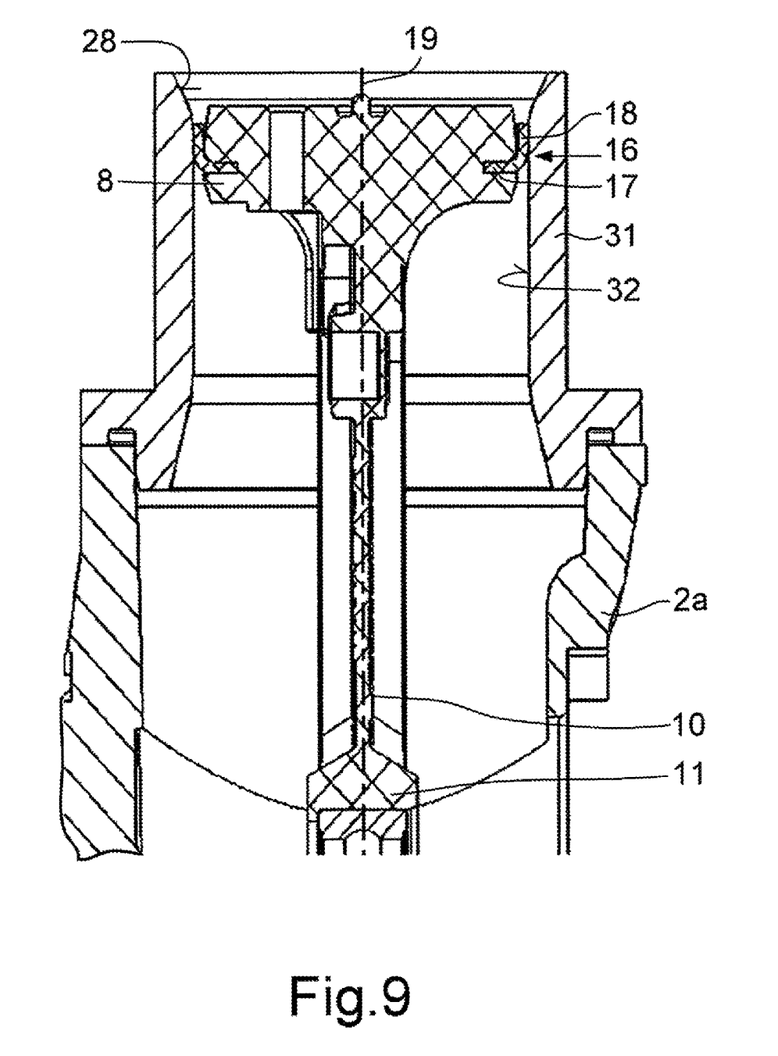
FIG. 9 shows a partial section similar to FIG. 8 through a piston-connecting rod unit after introduction into a cylinder of the reciprocating piston machine and the shaping of the preform into a cup seal.

If the material of the cup seal 16 is a rubber-elastic material, heating of the cylinder 31 by a heat source (not shown) is not required. If the material of the cup seal 16 is polytetrafluoroethylene (PTFE), for example, the cylinder 31 must be heated to a suitable temperature by means of a heat source 30, similarly to the sizing tool 27, in order to bring about plastic deformation of the axial region 18 of the cup seal 16.

Figure 10:
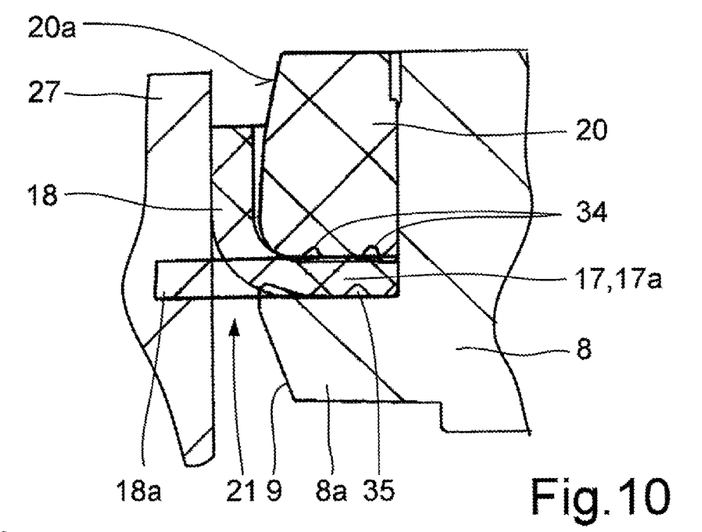
FIG. 10 shows an embodiment of a piston-connecting rod unit having a cup seal comprising a flat preform held by means of a press-on ring.
Figure 11:
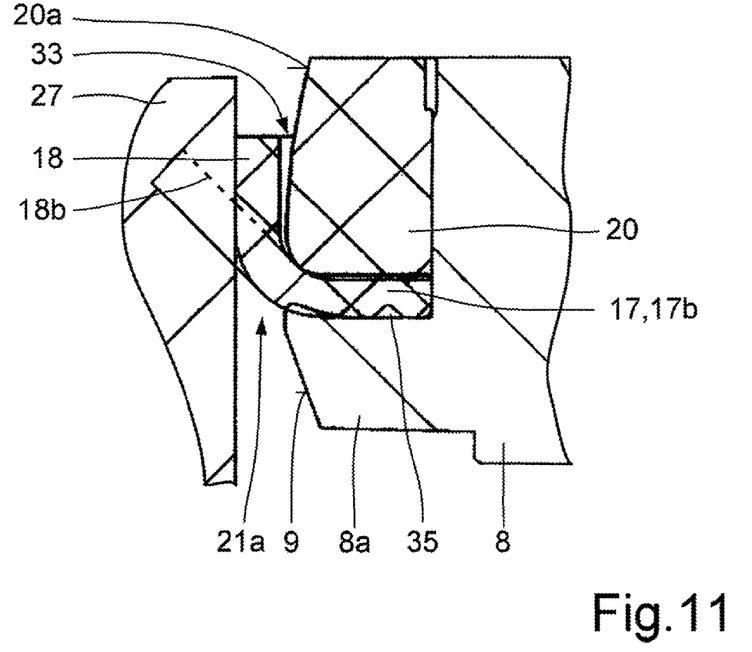
FIG. 11 shows a partial section through a piston-connecting rod unit having a cup seal secured on the piston by means of a press-on ring, starting from a slightly arched preform.

Whereas the piston 8 according to FIGS. 1 to 4 and 7 to 9 produced from the same material as the connecting rod shank 10 and the connecting rod eye 11 is provided with a molded-in cup seal 16 consisting of rubber-elastic material or PTFE, meaning that the piston material must also consist of a plastics material which can be injection molded at a temperature which does not damage the material of the cup seal 16 (this can, for example, be a fiber-reinforced plastic, such as a glass fiber-reinforced polyamide), the embodiment illustrated in FIGS. 10 and 11 can consist of a cast light alloy for the piston 8, the connecting rod shank 10 produced integrally therewith, and the connecting rod eye 11. In this embodiment, an annular preform 21, 21a in a flat or planar form according to FIG. 10 or in a slightly bent-up form according to FIGS. 5, 6 and 11 is secured on the piston 8 by means of its radial region 17a, 17b between a circular offset 8a and a press-on ring 20. The press-on ring can be held on the piston 8 by means of a pressure joint, adhesive joint or welded joint and has a circumferential surface 20a shaped as a spherical segment, complementary to the piston circumference 9, likewise shaped as a spherical segment, on the circular offset 8a of the piston 8.

According to FIG. 10, a flat preform 21 is clamped by means of its radial region 17a between the circular offset 8a and the press-on ring 20. A sizing tool 27 is then moved axially relative to the piston 8 in such a way that the initially radially projecting circumferential region 18a of the preform 21 is shaped into the axial region 18, bent by approximately 90°, of the cup seal 16, into the functional shape of the installed state. In this case, a conical encircling gap 33, which offers sufficient freedom of movement to the axial region 18 bent by approximately 90° during the pendulum movement of the piston 8 during the upward and downward movement in the cylinder 2, 31, remains between the axial region 18, bent by approximately 90°, of the cup seal 16 and the circumferential surface 20a of the press-on ring 20.

FIG. 10 shows that the radial region 17a of the preform 21 has encircling, axially aligned projections 34 and at least one encircling groove 35, which effect fixing and sealing of the radial region 17, 17a of the cup seal 21 between the circular offset 8a of the piston 8 and the press-on ring 20. In FIG. 11, in contrast, only one encircling groove 35 is shown in the radial region 17a of the preform 21.

In a similar way, the circumferential regions 17a, 17b of the preforms 21, 21a can be of smooth design, as illustrated in FIG. 5, while the circular offset 8a of the piston 8 and the press-on ring 20 are each provided with one or more encircling projections.

The embodiment according to FIGS. 10 and 11 can also be implemented with a pressure plate, as illustrated and described in DE 197 27 186 B4, instead of the press-on ring 20 illustrated in FIGS. 10 and 11, with a flat preform 21 according to FIG. 10 or a slightly arched preform 21a according to FIG. 11 being fixed on the piston 8 by a pressure plate, and being shaped into the axial region 18, bent by approximately 90°, of the cup seal 16 in the manner illustrated in FIGS. 7 to 11.

All the features mentioned in the abovementioned description of the figures, in the claims and in the introduction to the description can be used both individually and in any desired combination. The invention is thus not restricted to the combinations of features described and claimed. On the contrary, all combinations of features should be regarded as disclosed. While the above description constitutes the preferred embodiments of the present invention, it will be appreciated that the invention is susceptible to modification, variation and change without departing from the proper scope and fair meaning of the accompanying claims.

The invention claimed is:

1. A method for producing a piston having a central piston longitudinal axis and a piston circumference and having a circumferential seal in the form of a circular cup seal having a functional contour in an installed state, the functional contour having a first leg formed by a radial region held in the piston and radially centered around the central piston longitudinal axis and of a second leg formed by an axial region bent by approximately 90° with respect to the radial region and aligned approximately parallel to the central piston longitudinal axis, the method comprising the following steps:

placing a cup seal into a mold having a mold cavity for molding the piston in a first step in such a way that the radial region projects into the mold cavity and is radially centered in the mold cavity and that the axial region is held by the mold in a shape of a circumferential region that differs from the shape of the axial region of the functional contour,     overmolding only the radial region projecting into the mold cavity in a second step by filling the mold cavity with piston material to form the piston including the overmolded cup seal,     removing the piston including the overmolded cup seal from the mold in a third step, and     after the step of removing the piston, changing the shape of the circumferential region of the overmolded cup seal into the shape of the axial region of the functional contour of the overmolded cup seal corresponding to the installed state.

2. The method as claimed in claim 1, wherein, prior to being placed in the mold, the cup seal is a flat or arched preform with the radial region projecting into the mold cavity and with the circumferential region projecting radially beyond the mold cavity, the circumferential region being formed into the axial region in the fourth step, wherein the fourth step is carried out by permanently shaping the circumferential region into the second leg, bent by approximately 90° with respect to the radial region, to obtain the functional contour of the installed state.

3. The method as claimed in claim 2, wherein the fourth step of shaping the circumferential region of the preform into the axial region of the functional contour of the overmolded cup seal is performed by cold or hot forming with a sizing tool surrounding the circumferential region of the preform.

4. The method as claimed in claim 3, wherein the sizing tool has an annular shape and has an inside diameter corresponding approximately to an outside diameter of the axial region of the overmolded cup seal forming the second leg to shape the circumferential region of the preform into the axial region, and wherein the sizing tool is moved in an axial direction relative to the piston, over the radially projecting circumferential region of the preform while surrounding the piston circumference.

5. The method as claimed in claim 3, wherein the sizing tool is a cylinder of a reciprocating piston machine, and wherein the step of shaping the radially projecting circumferential region of the preform into the axial region of the functional contour of the overmolded cup seal is brought about by pushing the piston with the preform mounted thereon into the cylinder.

6. The method as claimed in claim 1, wherein the cup seal, prior to being placed in the mold, has the functional contour and wherein the fourth step is carried out by allowing the circumferential region to return elastically to the functional contour to form the second leg.

7. The method as claimed in claim 6, wherein, in the first step, the axial region of the cup seal is bent open into an approximately radial direction and substantially in alignment with the radial region when the axial region is introduced into the mold and is surrounded by the mold.

8. The method as claimed in claim 6, wherein, in the first step, the axial region of the cup seal is overbent radially when the axial region is introduced into the mold and is surrounded by the mold.

9. The method as claimed in claim 1, wherein the piston is a pendulum piston integral with a connecting rod having a connecting rod shank and a connecting rod eye with a bearing bore at an end of the connecting rod shank opposite from the piston.

10. The method as claimed in claim 7, wherein the piston is injection-molded in a mold from one plastic material and in one piece with the connecting rod shank and the connecting rod eye.

11. The method as claimed in claim 10, wherein the mold is a three-part mold, of which two mold halves are divided in a transverse plane extending centrally through the piston, through the connecting rod shank, and through the connecting rod eye, and wherein a third mold part adjoins the mold halves in a parting plane extending perpendicular to the central piston longitudinal axis, wherein the parting plane for the third mold part is arranged in in an axial section adjoining the clamped radial region of the cup seal, the mold having closing and opening movements of the two mold halves that occur perpendicularly to the piston longitudinal axis and the third mold part having closing and opening movements that occur in the direction of the piston longitudinal axis, and the circumferential regions of the cup seal or of the preform are accommodated in recesses in at least one part of the three-part mold when the mold is closed.

12. The method as claimed in claim 10, wherein the mold is an at least two-part mold, of which two mold halves are divided in a transverse plane extending centrally through the piston and the connecting rod shank, and wherein the axial region, bent by approximately 90°, of the cup seal is accommodated in recesses in the two mold halves when the mold is closed, said recesses being dimensioned in such a way that they overbend the axial region, bent by approximately 90°, of the cup seal in the direction of the piston longitudinal axis, and wherein the opening movement of the two mold halves takes place perpendicularly to the piston longitudinal axis.

13. The method as claimed in claim 1, wherein the radial region of the cup seal has apertures and/or dovetail cutouts for location in the piston, said apertures and/or cutouts being filled by the piston material during the production of the piston.

14. The method as claimed in claim 1, wherein the radial region of the cup seal has at least one annular groove or at least one projection for sealing with respect to the piston.

15. The method as claimed in claim 1, wherein the piston is a piston of a reciprocating piston machine.

16. The method as claimed in claim 15, wherein the reciprocating piston machine is a compressor.

\* \* \* \* \*